United States Patent Office 2,980,397
Patented Apr. 18, 1961

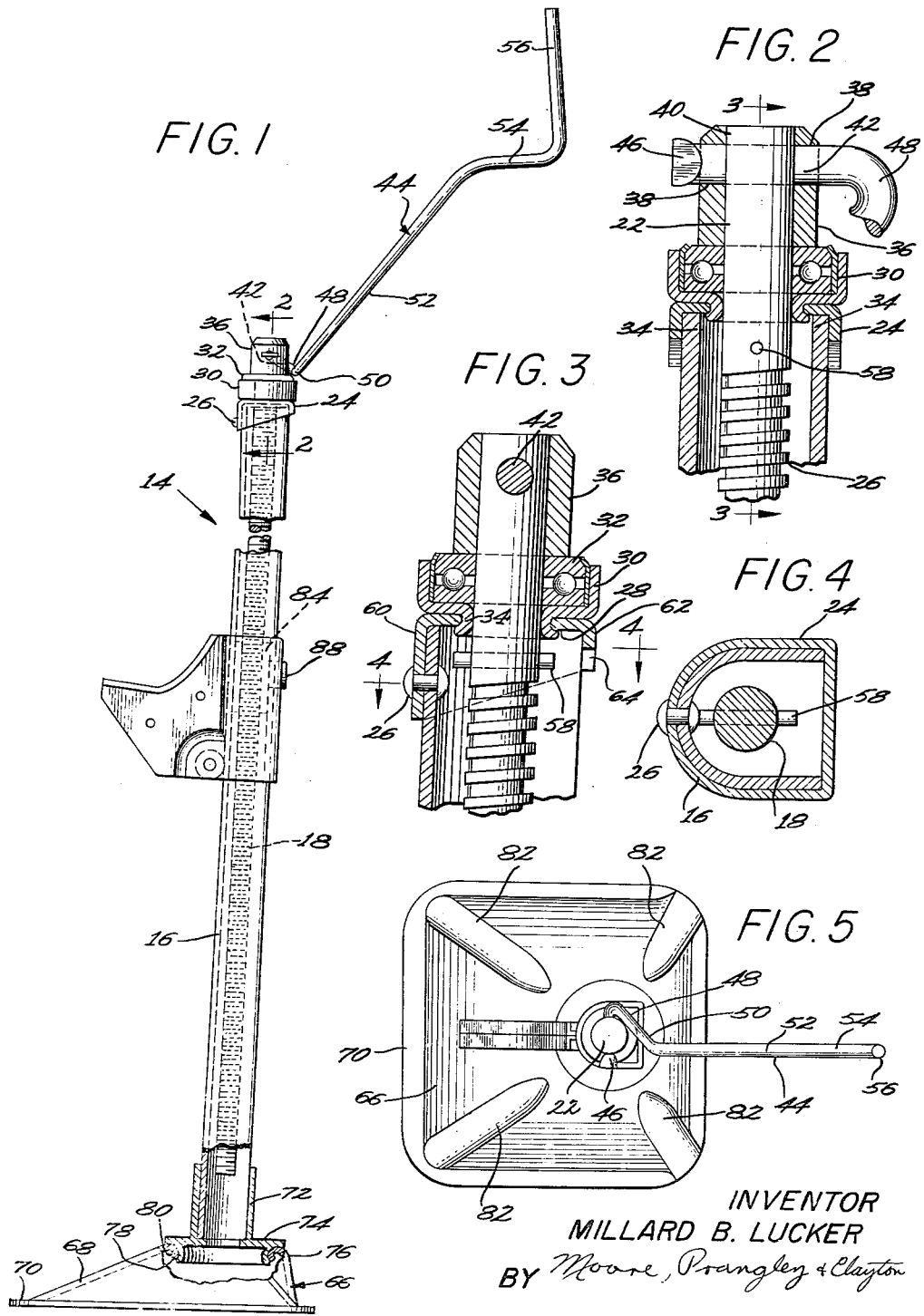

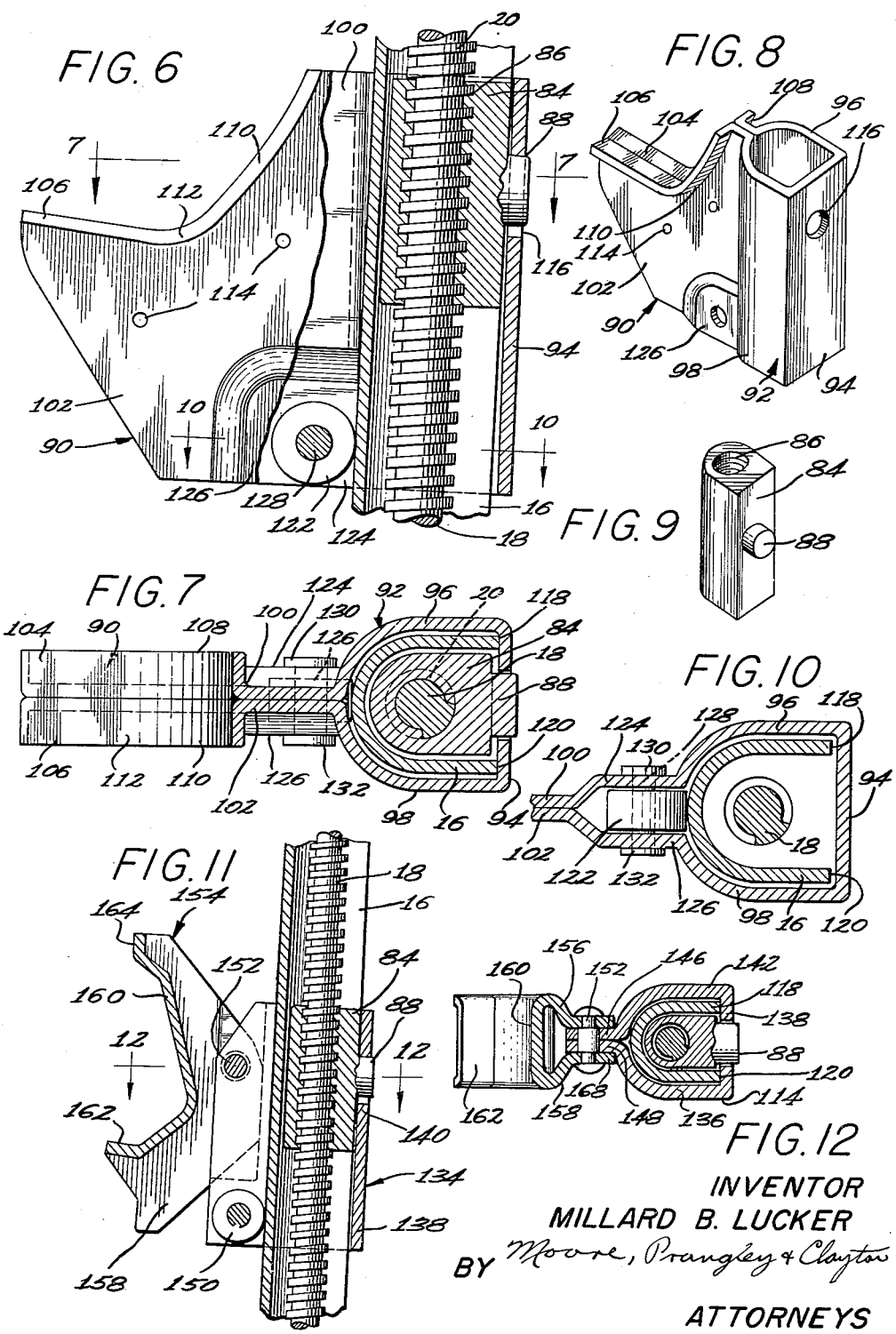

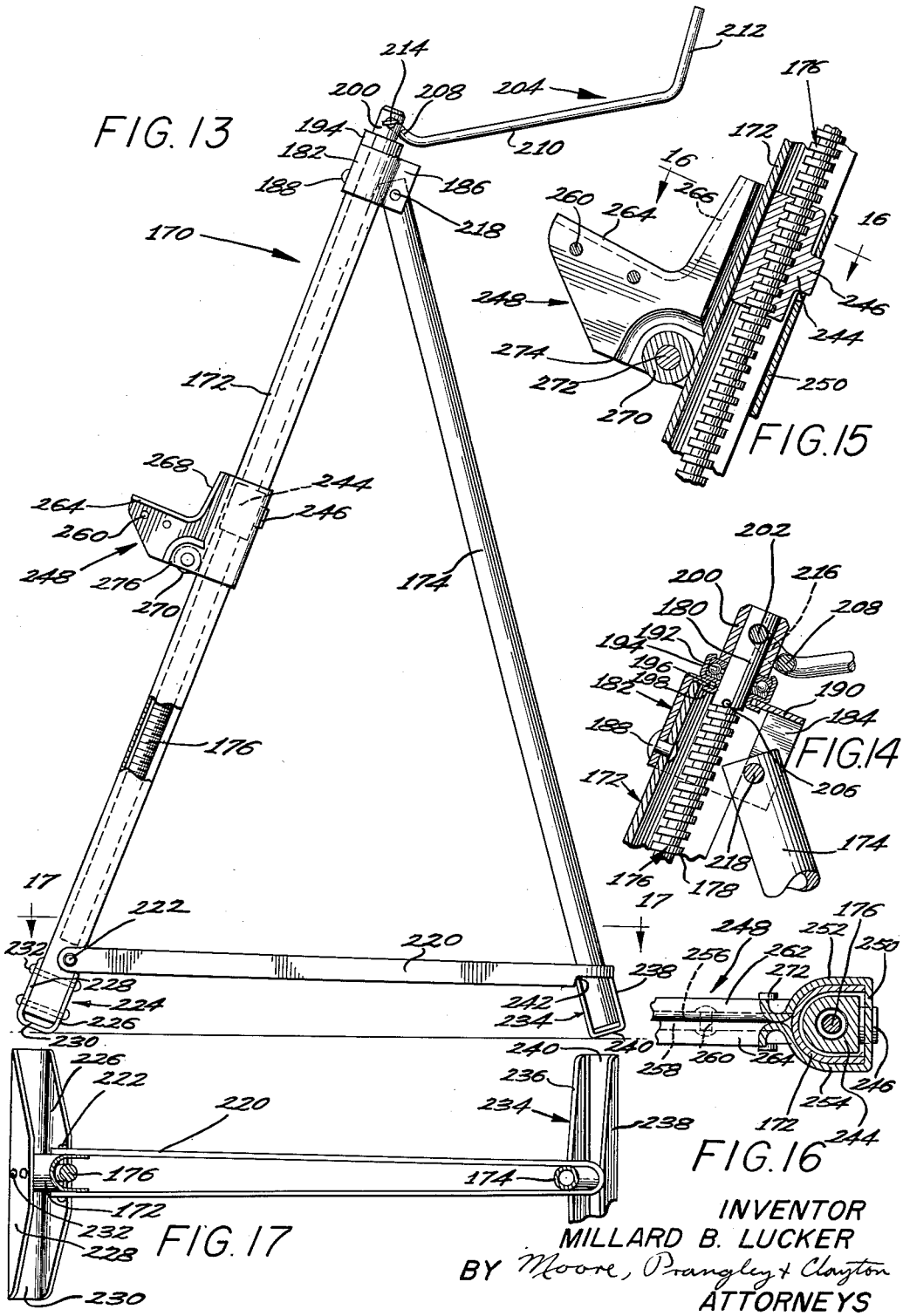

2,980,397

LIFTING JACK

Millard B. Lucker, St. Joseph, Mich., assignor to Auto Specialties Manufacturing Company, St. Joseph, Mich., a corporation of Michigan Filed July 14, 1954, Ser. No. 443,326

1 Claim. (Cl. 254—99)

This application is a continuation-in-part of application Serial No. 310,163, filed September 18, 1952, now abandoned.

The present invention relates to automobile lifting jacks, and more particularly to bumper jacks.

It is an object of this invention to provide an improved simple lightweight lifting jack which is very efficient and which may be manufactured relatively inexpensively.

Another object of this invention is to provide an improved automobile bumper jack which includes a lifting screw rod of relatively small diameter pendantly supported within an upstanding strut member, and a novel load engaging and lifting member actuated by the screw rod, which load lifting member is constructed and arranged to transmit any transverse bending forces to the strut while at the same time minimizing sliding frictional contact between the member and the strut.

Another object of this invention is to provide a lifting jack as described above, wherein the strut is U-shaped and the screw rod is disposed within the strut and wherein the load lifting member extends forwardly from the closed side of the U-strut so that any tendency for the rod to be pulled forwardly during the lifting of an automobile may be resisted by engagement of the load lifting member with the narrow longitudinally extending and rearwardly facing edges of the U-shaped strut.

Another object of this invention is to provide a novel and simple foot member for supporting the above described strut at a slight angle from the vertical, whereby any tendency for the jack to tip forwardly when being used to raise the automobile is resisted.

Still another object of the invention is to provide a two-legged jack including a strut, load lifting member and screw rod of the type set forth above.

It is another object of the present invention to provide an automobile bumper jack of the above described type with a novel bumper engaging member which is pivotally supported on the load lifting member, whereby the bumper engaging member may engage the bumper at two points at all times during the raising of an automobile without sliding over the bumper, thus eliminating the danger of marring or scratching the bumper.

Still another object of this invention is to provide an automobile bumper jack of the above described type with simple and novel means for pendantly supporting the screw rod within the strut.

A still more specific object of this invention is to provide means for pendantly supporting the screw rod within the strut, which means includes an actuating handle member formed so that it may be alternately moved from a position lying along the strut for compact storing to a position extending outwardly from the strut, where it may be conveniently grasped by an operator for actuating the screw rod.

Other objects and advantages of the present invention will be apparent from the following description and drawings, wherein:

Fig. 1 is a side elevational view of an automobile jack involving the principles of this invention;

Fig. 2 is an enlarged partial vertical cross section taken along line 2—2 of Fig. 1;

Fig. 3 is a partial vertical cross section taken along line 3—3 of Fig. 2;

Fig. 4 is a partial horizontal cross section taken along line 4—4 in Fig. 3;

Fig. 5 is a plan view of the automobile jack shown in Fig. 1;

Fig. 6 is an enlarged fragmentary side view partially in cross section, showing a novel load lifting member and a means for connecting it with the screw rod in accordance with the present invention;

Fig. 7 is a cross section taken along line 7—7 in Fig. 6;

Fig. 8 is a perspective view, showing the novel load lifting member of this invention;

Fig. 9 is a perspective view, showing a nut which cooperates with the screw rod for supporting and lifting the load lifting member;

Fig. 10 is a partial cross sectional view taken along line 10—10 in Fig. 6;

Fig. 11 is a fragmentary side view similar to Fig. 6, but showing a modified form of the novel load lifting member;

Fig. 12 is a cross sectional view taken along line 12—12 of Fig. 11;

Fig. 13 is a side elevational view with certain portions broken away of a two-legged automobile jack incorporating the principles of the present invention;

Fig. 14 is an enlarged partial view in vertical section of the upper end of the two-legged lifting jack shown in Fig. 13;

Fig. 15 is an enlarged partial view in vertical section of the load lifting member incorporated in the jack of Fig. 13 and showing the manner in which the load lifting member engages the strut and the screw rod;

Fig. 16 is a partial view in horizontal section substantially as seen in the direction of the arrows along the line 16—16 of Fig. 15; and Fig. 17 is a view in horizontal section showing the supporting structure of the jack of Fig. 13 substantially as seen in the direction of the arrows along the line 17—17 of Fig. 13.

Referring now more specifically to the drawings, wherein like parts are designated by the same numeral throughout the various figures, a novel automobile bumper jack, involving the principles of this invention is generally designated by the numeral 14. The jack 14 includes a strut 16 having opposite side walls joined by a bight portion and presenting a generally U-shaped cross section, as shown best in Fig. 4, and which strut provides a housing having the inner surfaces of the side walls spaced apart preferably about one inch and which preferably has an internal depth of about one inch. The strut 16 is preferably formed of re-rolled rail stock, which is about 5/32 of an inch thick, in order to provide a very strong and rigid strut which is capable of supporting the load of one end of an automobile. The strut 16 is preferably about 31 or 32 inches high so that the jack may produce a relatively high lift when applied to the bumper of an automobile.

An elongated screw rod 18 is pendantly mounted within the strut 16 and extends for substantially the entire length of the strut. This pendulous mounting enables a relatively small and inexpensive screw rod of about 5/8 of an inch diameter to be used, which rod is relatively weak and incapable of supporting by itself the load of one end of an automobile without buckling. All of the dimensions given above are preferred since they produce an operative jack which will perform its intended function while requiring a minimum of materials. However, it is obvious that the dimensions may be varied to produce jacks having different load lifting capacities. The screw rod 18 is provided with screw threads 20 substantially along its entire length. The upper end of the screw rod 18 is, however, unthreaded, and the unthreaded portion 22 extends beyond the upper end of the strut 16, see Fig. 2.

The upper end of the strut 16 is enclosed with a sheet metal cap 24, which is secured to the strut by means of rivet 26. Cap 24 is provided with a central aperture 28 through which the unthreaded portion 22 of the screw rod extends. Disposed on top of the cap 24 is a cup-shaped bearing retaining member 30 adapted to receive and retain a thrust bearing 32, which is preferably of the ball bearing type. The cup-shaped bearing retaining member 30 is provided with a depending annular sleeve 34, which depends from the cup-shaped member through the aperture 28 of the cap 24. The terminal end portions of the sleeve 34 are flared outwardly to engage the under surface of the cap 24 to retain the cup member 30 in assembled relationship with the cap 24. As shown in Fig. 3, the unthreaded portion 22 of the screw rod extends upwardly beyond the thrust bearing 32, and this upwardly extending portion is surrounded by a thimble 36 having aligned apertures 38 therein. The upper end of the screw rod is also provided with an aperture 40 adapted to be aligned with the apertures 38. In order to retain the screw rod against downward displacement, a pin 42 is inserted through the aligned openings 38 and 40. This locks the thimble 36 to the screw rod, and downward movement of the screw rod is resisted by the engagement of the lower end of the thimble with the upper surface of the thrust bearing 32.

The pin 42 is preferably provided by an end portion of an actuating handle member 44. As shown in Fig. 2, one end of the pin 42 is flattened and enlarged, as at 46, to prevent removal of the pin from the apertures. The opposite end of the pin 42 merges into a U-shaped portion 48 of the handle, which doubles back along the outer surface of the thimble, as shown best in Fig. 5. As shown in Fig. 1, the U-shaped portion 48 is formed so that the leg 50 thereof will engage the side of the thimble 36 when the handle member is in its operating position. The U-shaped portion 48 then merges into a relatively straight portion 52 which extends substantially normally from the plane of the U-shaped portion 48. The straight portion 52 then merges into an outwardly bent portion 54, which terminates in an upwardly extending handle portion 56. By this construction, it is seen that the handle member when in the operating position rests against the thimble 36 which turns as the handle is operated, whereby the possibility of friction is eliminated between the handle and other parts of the jack while the handle is being operated. In addition, it is seen that the handle, because of its novel formation, extends upwardly to a position where it may be readily grasped by the operator to actuate the jack. Moreover, because of the formation of the U-shaped portion 48, which spaces the leg 50 away from the pin 42 a distance greater than the radius of the thimble 36, the handle 44 may be pivoted about the pin 42 from the operating position shown in Fig. 1 to a collapsed position extending downwardly along the strut for storing or shipping.

The screw rod 18 is restrained against unauthorized upward displacement from the strut 16 by means of a pin 58 extending through an aperture in the unthreaded portion 22 of the screw rod. It is seen that upon upward movement of the screw rod relative to the strut, the pin 58 will engage the outturned end portions of the sleeve 34 to retain the screw rod within the strut. In order to make the maximum length of the screw rod available for the screw threads 20, it is desirable to position the locking pin 58 as close as possible to the under surface of the cap 24. It should be noted, therefore, that the lower edge of the cap 24 is inclined upwardly from the front portion 60 thorugh which the rivet 26 extends to a relatively short depending rear section 62. In addition, the rear section 62 is notched as at 64, which notch provides clearance to enable the pin 58 to be inserted through an aperture in the screw rod 18 located relatively close to the under surface of the cap 24.

The strut 16 is supported in its upright position by foot member 66 which includes a stamped sheet metal member 68 having a flat peripheral flange 70 adapted to engage a support surface. As shown best in Fig. 1, sheet metal member 68 is formed so that the front portion thereof is inclined upwardly at a relatively small angle from the horizontal while the rear portion of the foot member is inclined upwardly from the horizontal at a relatively great angle. This structure causes the front and rear inclined portions of the sheet metal member 68 to reach the same level at points adjacent the rear edge of the foot member 66. By this structure, it is seen that the foot extends substantially forwardly of the upstanding strut 16 and, therefore, resists the tendency of the jack to tip forwardly when being used to raise an automobile. A socket member having an upstanding sleeve 72 shaped to receive the lower end of the strut 16 is supported on the plate member 68. The socket member is provided with a radially extending flange 74 adapted to rest on top of the plate member 68 and a tubular projection 76 depending from an intermediate portion of the flange 74 through an opening 78 in the sheet member 68. As shown in Fig. 1, the peripheral opening surrounding edge portion 80 of the sheet member 68 is curved downwardly, and the tubular projection 76 is flared outwardly to engage under the curved edge 80. This structure provides a secure connection between the socket member and the foot member 66. It should be noted that the socket member is constructed so that the strut receiving sleeve is slightly inclined rearwardly from the vertical. Thus, the strut 16 is supported in a position slightly inclined rearwardly from the vertical at an angle of about two or three degrees, which structure enables the jack to resist any tendency to tip forwardly when raising an automobile. As shown in Fig. 5, the foot member 66 is of generally rectangular shape, and rigidifying ribs 82 are stamped in the sheet member 68 to provide additional strength. Preferably, the ribs 82 extend radially inwardly from the four corners of the foot member.

Mounted on the screw rod 18 is a block or nut member 84 (see Fig. 6) having a threaded bore 86 adapted to cooperate with the threads 20 of the screw rod, whereby the nut member 84 may be raised or lowered by rotating the screw rod. As shown best in Fig. 7, the exterior dimensions of the nut member 84 are such that the nut member is spaced from the interior surfaces of the strut 16, whereby the screw rod, which has its lower end free, may swing back and forth and from side to side within the strut. This structure prevents the nut member 84 from frictionally engaging the interior surfaces of the strut 16, and, furthermore, it prevents the nut member from binding on the screw rod, which binding might occur if the screw rod were rigidly mounted within the strut and the strut and rod became misaligned for any reason. A projection 88, which is adapted to support a load engaging and lifting member 90, extends from the rear face of the nut member 84 and through the open side of the strut 16. Nut member 84 has a length sufficient to prevent it from tilting on the screw rod, whereby the possibility of binding between the nut member and rod is eliminated.

As shown best in Figs. 6, 7, and 8, the load engaging and lifting member 90 is preferably constructed from a single piece of sheet metal. The sheet metal is formed so that the load lifting member 90 is provided with a body section 92 which is shaped to surround the U-shaped strut 16, as shown in Fig. 7. The body section 92 is formed so that its interior walls or surfaces are slightly spaced from the exterior surfaces of the strut 16. The body section 92 includes a rear wall 94 and side walls 96 and 98 which are bent to conform with the U-shaped channel strut and to meet at the mid portion of the closed end of the U-shaped strut. Load or bumper engaging portions 100 and 102 extend forwardly from the front edges of the sides 96 and 98. As shown in Figs. 6 and 7, the load engaging projections 100 and 102 are cut away to provide a bumper supporting recess or saddle. It should be noted that the load engaging projections 100 and 102 carrying the saddle extend forwardly of the closed end of the U-shaped strut 16.

The bumper supporting recess or saddle is defined by flanges 104 and 106, which extend outwardly from the load engaging projections 100 and 102 to form a flat relatively broad bumper supporting surface. As shown in Fig. 6, the flanges 104 and 106 are inclined upwardly from the horizontal to prevent the bumper from slipping off while the automobile is being raised. The flanges 104 and 106 merge into flanges 108 and 110, which are curved upwardly to conform with the general shape of automobile bumpers. The junction between the flanges 104 and 108 and 106 and 110, which is indicated in Fig. 6 by the numeral 112, provides a stop to limit the rearward movement of a bumper on the flanges 104 and 106. The junction or stop 112 is positioned well in front of the body section 92 of the load lifting member 96, and, thus, the load is applied at a point which tends to tilt the member 96 as is more fully described below. In order to provide a rigid structure, the load supporting projections 100 and 102 are preferably joined together by any suitable means, such as projection welds 114.

As stated above, the load lifting member 90 is supported on the projection 88 of the nut 84. For this purpose, the rear wall 94 of the load lifting member 90 is provided with an aperture 116 through which the projection 88 extends. The projection 88 is shown as having a circular cross section, and the opening 116 is constructed so that it has a diameter greater than the diameter of the projection. Because of this construction and because the body section 92 of the load lifting member 90 is constructed so that its inner dimensions are greater than the outer dimensions of the strut 16, the load lifting member may pivot or tilt about a horizontal axis which is substantially a line contact at the point of engagement of the top of the opening 116 with the top of the projection 88. In addition, since the screw rod 18 is pendantly mounted, the load lifting member 90 and the nut member 84 may pivot or tilt slightly about a horizontal axis which is at the connection of the screw rod with the strut. This tilting action, which takes place when a load is applied to a load lifting member, causes the rear wall 94 of the load lifting member to engage the strut 16 along the relatively narrow bearing surfaces 118 and 120 (see Fig. 7), which are provided by the longitudinal edges of the side walls of the strut. It should be noted, however, that because of this tilting action, only a relatively narrow area along the upper edge of the rear wall 94 will engage the bearing surfaces 118 and 120. Thus, sliding contact between the rear wall 94 and the bearing surfaces is reduced to a minimum. This tilting action also causes the lower portions of the front marginal edges of the side walls 96 and 98 to move toward the closed end of the U-shaped strut 16.

In order to prevent sliding frictional engagement between the relatively broad surfaces of the closed end or bight portion of the U-shaped strut 16 and the side walls 96 and 98 of the load lifting member 90, roller 122 is mounted adjacent the lower edges of the load engaging projections 100 and 102. The projections 100 and 102 are stamped or otherwise deformed outwardly as at 124 and 126 to provide a housing for receiving the roller 122. The roller 122 is supported by a pin 128 extending through openings in the housing walls 124 and 126, which pin has its outer ends 130 and 132 enlarged for retaining the pin and the roller within the housing. As seen best in Figs. 6 and 10, the roller 122 is located so that it extends slightly beyond the inner surfaces of the sides 96 and 98 to engage the strut 16 and space the sides 96 and 98 therefrom. The closed end of the strut 16 presents a bearing surface which is engaged by the roller 122 and which faces in a direction opposite from the bearing surfaces 118 and 120. Thus, when a load is applied to the load lifting member, any forces which are directed transversely of the jack are transmitted directly to the strut by the roller 122 engaging the bearing surface of the closed end of the strut and/or by the upper edge portion of the wall 94 engaging the bearing surfaces 118 and 120. Since the screw rod is free to move back and forth within the strut 16, the rod is free from any such transverse forces, and the only load upon the rod will be directed axially thereof by the load lifting member bearing downwardly on the projection 88 of the nut member 84.

Figs. 11 and 12 show a lifting jack wherein a modified form of the novel load lifting member of this invention is utilized. In this embodiment, the strut, screw rod, and nut member are identical with the similar parts described above, as indicated by the numerals. A load lifting member 134 is provided which has a body section 136 preferably made of sheet metal and formed substantially identical to the body section 92 of the load lifting member 90 described above. Thus, the body section 136 is provided with a rear wall 138 having an aperture 140 therein to receive the projection 88 and side walls 142 and 144 which are spaced from and curved around the outer surfaces of the U-shaped strut 16. Flanges 146 and 148 extend forwardly from the front edges of the side walls 142 and 144. Adjacent their lower edges, the flanges 146 and 148 are stamped or deformed outwardly to provide a housing adapted to receive a roller 150. The roller 150 is constructed and arranged in a manner identical to the above described roller 122.

Adjacent their upper edges, the flanges 146 and 148 are provided with aligned openings adapted to receive a pivot pin 152 for pivotally mounting the bumper gripping member 154. The bumper gripping member 154 is of generally C-shape when viewed as shown in Fig. 11. The member 154 is preferably constructed from sheet metal which is bent to provide side walls 156 and 158 connected by a bight portion 160. The bight portion 160 is provided with a bumper supporting surface 162 on which the bumper is adapted to rest and a projection 164 adapted to engage and grip an upper portion of the bumper. The surface 162 is inclined upwardly in a general direction toward the projection 164 so that the surface 162 provides a hook adapted to retain the bumper in all positions of the bumper engaging member 154. The bumper engaging member 154, thus, provides a two-point contact for the bumper, which structure grips the bumper and prevents it from sliding on the jack. The rear portions of the sides 156 and 158 are bent inwardly as at 166 and 168 to embrace the outer surfaces of the flanges 146 and 148, as shown best in Fig. 12. The side portions 166 and 168 are provided with aligned openings through which the pin 152 extends to support the member 154. It should be noted that the pin 152 pivotally connects the member 154 to the flanges 146 and 148 so that the member 154 may pivot while an automobile is being raised, so as to maintain said two-point contact at all times.

There is shown in Figs. 13 through 17 of the drawings a two-legged jack embodying the principles of the present invention. The two-legged jack which is generally designated by the numeral 170 has a U-shaped strut 172 supported in an inclined manner during operation by a leg 174. Strut 172 is similar to strut 16 described above and is identical in construction therewith.

Suspended within strut 172 is a threaded screw rod 176 identical in construction with screw rod 18 described above, screw rod 176 having threads 178 formed thereon throughout the major portion of the length thereof and having an unthreaded portion 180 extending above the upper end of strut 172.

There is provided on the upper end of strut 172 a cap 182 having depending walls surrounding strut 172 and extending rearwardly therefrom into parallel portions 184 and 186. A rivet 188 passes through the forward wall of cap 182 and the forward wall of strut 172. The upper end of cap 182 is closed by a wall 190 which extends rearwardly to the ends of parallel portions 184—186. An aperture is provided in upper wall 190 to receive the unthreaded end 180 of screw rod 176.

In order to facilitate turning of screw rod 176 there is provided at its upper end a ball bearing assembly 192 which is held in position by a circular retaining member 194 which rests upon upper wall 190 of cap 182. Retaining member 194 has a flange 196 depending downwardly therefrom and through the aperture in wall 190, flange 196 being turned outwardly as at 198 to lock retaining member 194 in position on cap 182.

The unthreaded end 180 of the screw rod 176 extends upwardly beyond ball bearing assembly 192 and this portion of the screw rod 176 is surrounded by a thimble 200 having aligned apertures therein which are in turn aligned with an aperture through screw rod 176 to receive a pivot portion 202 of the handle which is generally designated by the numeral 204. Pivot portion 202, in cooperation with thimble 200 which bears against ball bearing assembly 192, prevents the screw rod 176 from moving downwardly with respect to strut 172. A pin 206 positioned beneath retaining member 194 prevents screw rod 176 from being moved upwardly and away from strut.

Handle 204 is constructed similar to handle 44 at the point at which it engages thimble 200. More specifically as is best seen in Fig. 14, handle 204 has a bearing portion 208 which rests against thimble 200 when the handle is in operative position. Formed integral with portion 208 is a relatively straight portion 210 which is inclined slightly upwardly and terminates in upstanding grasping portion 212. The end 214 which extends through thimble 200 is flattened as is seen in Fig. 13 and a U-shaped portion 216 connects pivot portion 202 and the bearing portion 208. The distance between pivot portion 202 and bearing portion 208 is greater than the distance between pivot portion 202 and the uper end of thimble 200 and the unthreaded portion 180 of screw rod 176 so that the handle can be turned to the folded non-operative position.

Leg 174 supports strut 172 and the associated parts in an inclined position. The upper end of leg 174 is pivoted by a pin 218 between the parallel portions 184—186 of cap 182. The leg 174 and strut 172 are locked in the illustrative operative position by a strap 220 which is pivoted to strut 172 adjacent its lower end by a pin 222.

The lower end of strut 172 is provided with a supporting foot generally designated by the numeral 224 including a pair of upstanding walls 226 and 228 which are disposed substantially parallel and are joined at the lower ends by a wall 230. Strut 172 fits between walls 226 and 228 and is fixedly attached thereto by a pair of rivets 232. Walls 226 and 228 preferably taper downwardly at the outer ends as illustrated in Fig. 17.

The lower end of leg 174 is provided with a similar supporting foot 234 having a pair of parallel walls 236 and 238 joined by another wall 240. Foot 234 is secured to leg 174 in any suitable manner such as by welding.

Strap 220 is provided at its rear end with a pair of notches 242 (see Fig. 13) which engage the upper edge of wall 236 on foot 234 to hold leg 174 in the extended operative position. When it is desired to store jack 170, strap 220 is pivoted upwardly around pin 222 and this permits leg 174 to be swung into a position substantially parallel to strut 172.

Referring now to Figs. 15 and 16 the load engaging member will be described in detail. A nut member 244 threadedly engages screw rod 176 and has a projection 246 extending rearwardly therefrom and out of strut 172. Nut member 244 and projection 246 are identical in construction to and perform the same functions as nut member 84 and projection 88 described above.

The load engaging member which is generally designated by the numeral 248 is formed substantially of a single piece of sheet metal folded to form a rear wall 250 having an aperture therein to receive projection 246. Formed integral with rear wall 250 is a pair of side walls 252 and 254 which extend forwardly and are curved to conform to the shape of the exterior of strut 172. Formed integral on the forward edges of side walls 252—254 are a pair of plates 256 and 258, respectively which are held together by a pair of rivets 260 to form the main load supporting member. The upper edges of these plates are bent outwardly to form support surfaces 262 and 264 which are curved upwardly as at 266 and 268. It will be noted that the forwardly extending portions 262 and 264 are tilted upwardly in use and serve to trap a bumper or other part to be lifted at the junction with the upwardly and rearwardly directed support surfaces 266—268.

The load supporting member 248 is provided adjacent its lower forward edge with a roller 270 mounted on an axle 272 supported by a pair of outwardly deformed portions 274 and 276 formed on load lifting member 248. Roller 270 bears against the forward surface of strut 172 and forms the main bearing for the load upon strut 172.

When a load is applied to load lifting member 248, the load lifting member 248 is pivoted about roller 270 so that the upper portion of rear wall 250 bears against the rearwardly disposed free edges of strut 172. This relieves the screw rod 176 of any bending movement since it is connected to the load lifting member 248 only by a very loose connection between projection 246 and the aperture in rear wall 250. Screw rod 176 therefore is never deformed or bound against strut 172 even though heavy eccentric loads are applied to the load lifting member 248.

From the above description, it is seen that the present invention provides an automobile jack which may be inexpensively made primarily from sheet materials and which utilizes a relatively small and inexpensive screw rod, thereby further reducing the cost of the jack. Furthermore, it is seen that the novel construction of the load lifting member is such that any forces exerted transversely of the jack are transmitted directly to the strut, while at the same time, sliding frictional contact between the strut and the load lifting member is reduced to a minimum, thereby increasing the efficiency of the jack.

Furthermore, the construction of the foot member for supporting the one-legged jack is such as to provide a very stable jack which will resist any tendencies of the jack to tip forwardly.

There also has been provided a two-legged jack incorporating the features of the present invention. More specifically the two-legged jack made according to the present invention provides a structure in which no bending or transverse loads are applied to the screw rod, all such loads being transmitted directly to and carried by the strut.

While preferred embodiments of the present invention have been shown and described herein for the purposes of illustration, it is obvious that many changes can be made in the structural details without departing from the spirit and scope of the appended claim.

I claim:

A lifting jack comprising an upstanding channel-shaped strut having a forwardly disposed arcuate bight portion and a pair of spaced apart generally straight sides extending rearwardly from said bight portion and presenting rearwardly facing edges, said edges defining an opening and providing a pair of spaced apart and upwardly extending bearing surfaces, a screw rod pendantly supported within said strut and disposed entirely forwardly of the rearwardly facing edges of the strut, a nut member threadedly engaging said screw rod within said strut and having a transverse cross section smaller than an interior transverse cross section of the strut for permitting limited lateral movement of the nut member relative to the strut, said nut member including portions engageable with said strut for preventing rotation of the nut member when the screw rod is rotated, means for rotating said screw rod for moving said nut member along the screw rod within the strut, said nut member including a pin extending rearwardly through said opening and generally perpendicular to said strut and having a rounded upper surface, and a load lifting member having a portion thereof provided with a rounded aperture of greater curvature than that of the pin to loosely receive the pin and permit relative tilting movement between the nut member and the load lifting member, said load lifting member being engaged on said pin for upward travel with the nut member along the screw rod and including a load engaging portion extending forwardly with respect to said bight portion, the engagement between the relatively different surface curvatures of said aperture and said pin providing substantially a line contact permitting relative lateral pivotal movement between the nut member and the load lifting member with minimum sliding friction therebetween.

References Cited in the file of this patent

UNITED STATES PATENTS

| | | |
|---|---|---|
| 843,660 | Brewster | Feb. 12, 1907 |
| 908,872 | Leopold | Jan. 5, 1909 |
| 1,526,155 | Kinney | Feb. 10, 1925 |
| 1,526,156 | Kinney | Feb. 10, 1925 |
| 2,125,493 | Foster | Aug. 2, 1938 |
| 2,221,203 | Sandberg | Nov. 12, 1940 |
| 2,536,481 | Winchell | Jan. 2, 1951 |
| 2,543,100 | Engh | Feb. 27, 1951 |
| 2,630,295 | Lucker | Mar. 3, 1953 |
| 2,630,296 | Lucker | Mar. 3, 1953 |
| 2,663,542 | Lincoln et al. | Dec. 22, 1953 |
| 2,743,903 | Lucker | May 1, 1956 |
| 2,755,065 | Nilson | July 17, 1956 |

FOREIGN PATENTS

| | | |
|---|---|---|
| 974,647 | France | Feb. 23, 1951 |
| 671,911 | Great Britain | May 14, 1952 |